(12) United States Patent
Yaotian

(10) Patent No.: US 8,431,200 B2
(45) Date of Patent: Apr. 30, 2013

(54) BIODEGRADABLE ENVIRONMENTALLY-FRIENDLY MATERIAL, A CONTAINER, AND THEIR MANUFACTURING METHODS

(76) Inventor: Chen Yaotian, Foshan (CN)

( * ) Notice: Subject to any disclaimer, the term of this patent is extended or adjusted under 35 U.S.C. 154(b) by 8 days.

(21) Appl. No.: 12/817,922

(22) Filed: Jun. 17, 2010

(65) Prior Publication Data

US 2010/0323135 A1    Dec. 23, 2010

(30) Foreign Application Priority Data

Jun. 17, 2009   (CN) .......................... 2009 1 0147886

(51) Int. Cl.
*B27N 5/02* (2006.01)
*C08K 5/00* (2006.01)

(52) U.S. Cl.
USPC ......................................... 428/35.6; 523/128

(58) Field of Classification Search ................ 428/35.6; 523/128
See application file for complete search history.

(56) References Cited

U.S. PATENT DOCUMENTS 3,425,970 A * 2/1969 Hall et al. .......................... 524/9

FOREIGN PATENT DOCUMENTS

CN          1908070 A *   2/2007

OTHER PUBLICATIONS

Imperial Industrial Chemicals' polyethylene glycol technical information sheet (Dec. 1, 2005).*
PENPET Petrochemical Trading's hexamine material safety data sheet (Dec. 1, 2006).*
Polysciences, Inc.'s Biodegradable Polymers Technical Data Sheet (Apr. 21, 2009).*
Swift, G. 2000. Polymers, Environmentally Degradable. Kirk-Othmer Encyclopedia of Chemical Technology.*

* cited by examiner

*Primary Examiner* — Gwendolyn Blackwell
*Assistant Examiner* — Susan R Dye
(74) *Attorney, Agent, or Firm* — Polster, Lieder, Woodruff & Lucchesi, L.C.

(57) ABSTRACT

A biodegradable environmentally friendly material, a container and method of manufacturing. The components and weight percentages of the material or the container include: plant straw powder 50-70%, melamine 20-30%, polypropylene hot melt adhesive 2-6%, polyethylene glycol 5-8%, hexamethylene tetramine 0.5-1%, talc powder 2-6%. The method of manufacturing includes: the components are mixed in proportion and blended uniformly to obtain the mixed powder. The mixed powder is put into a mold with a temperature of 140-160° C. and pressed into necessary shapes to obtain the finished products. The finished products are disinfected and packaged. The biodegradable environmentally friendly material, the container and the method of manufacturing provide good temperature resistance, good corrosion resistance, good strength, difficult to rupture, simple production process, low cost, low energy consumption and high efficiency.

4 Claims, 6 Drawing Sheets

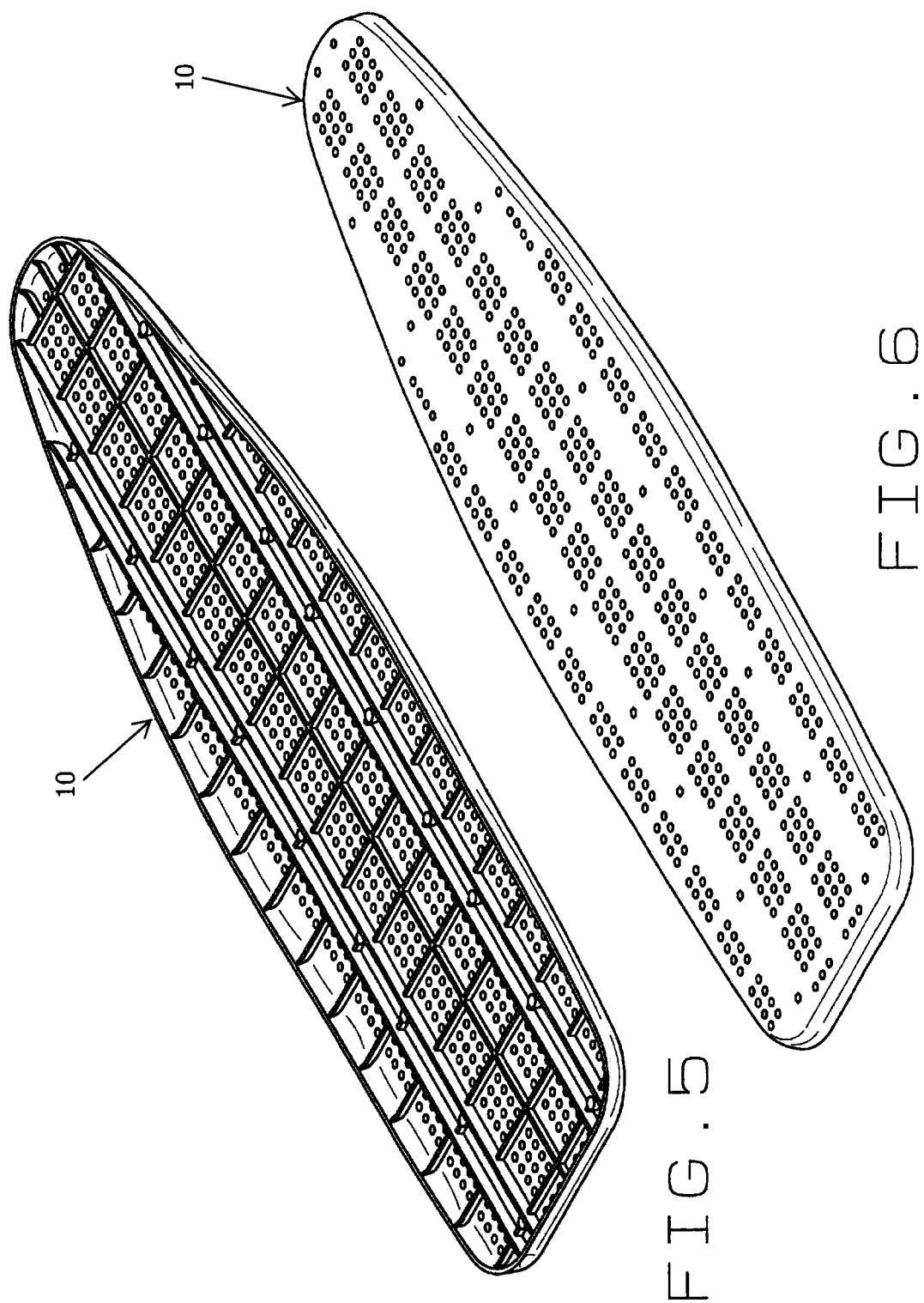

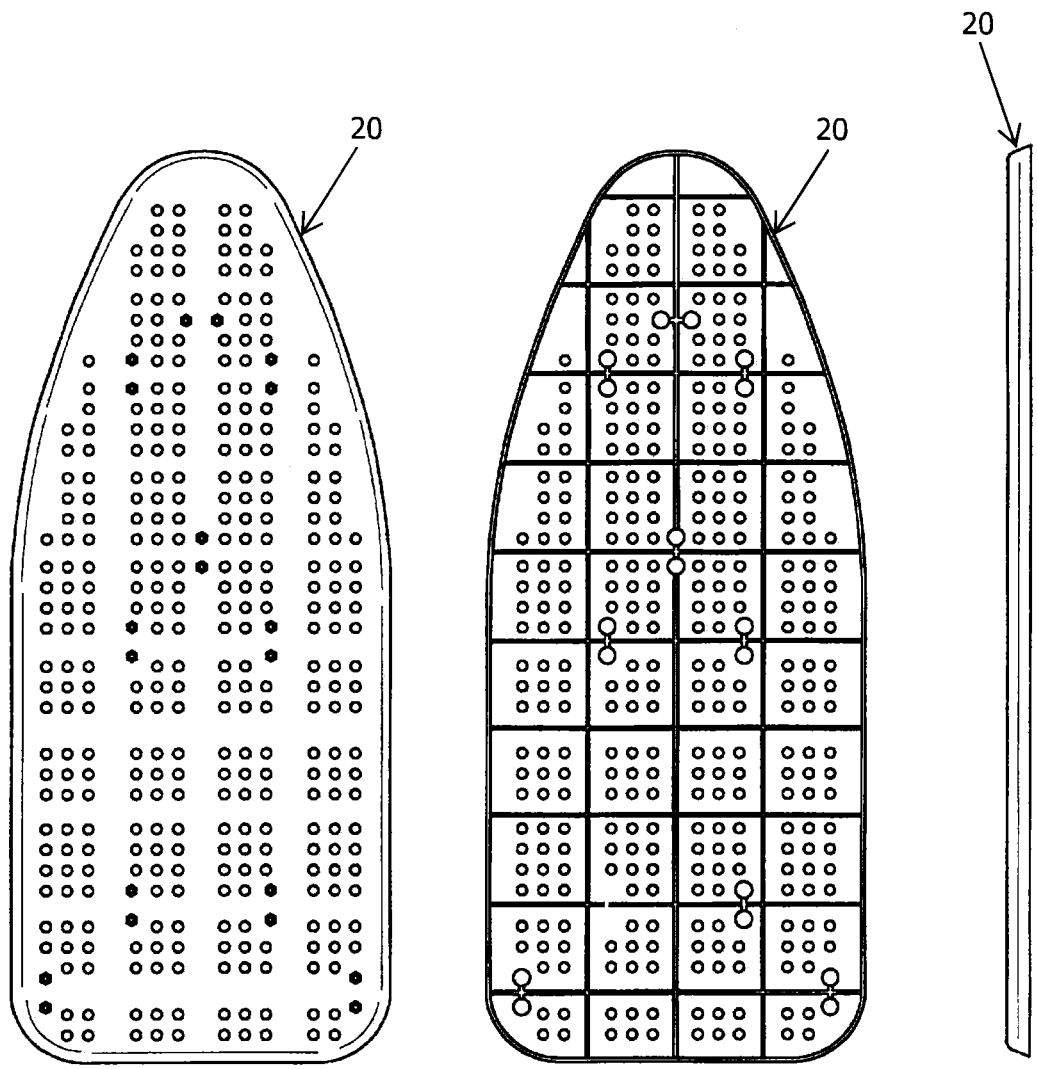
FIG. 7   FIG. 8
FIG. 9
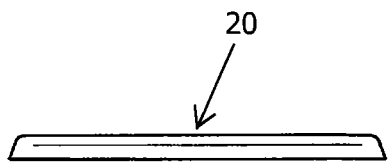
FIG. 10

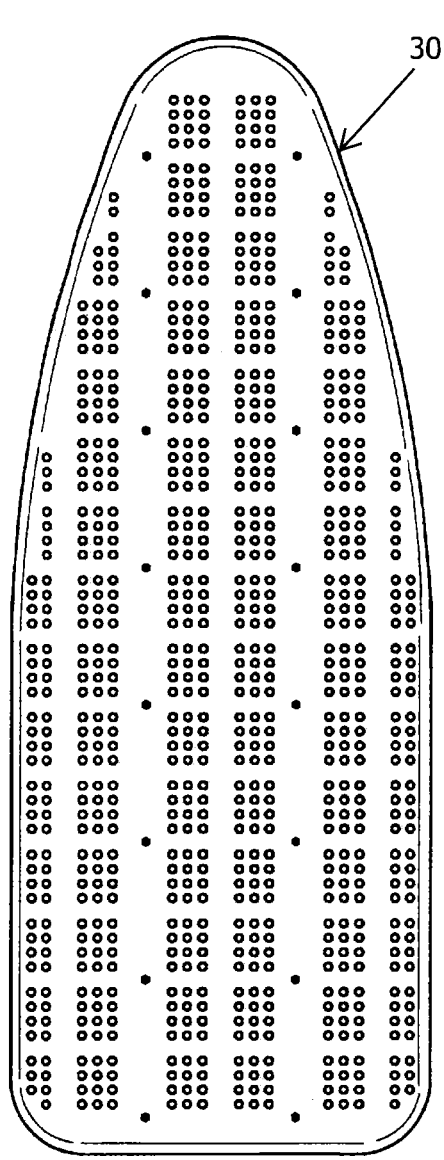
FIG. 13
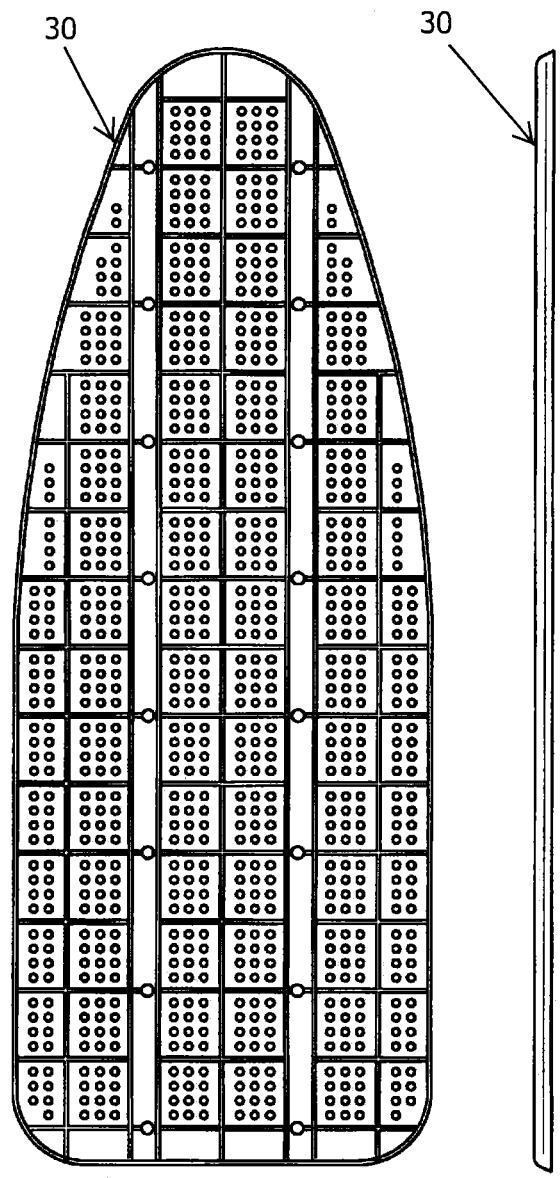
FIG. 14
FIG. 15
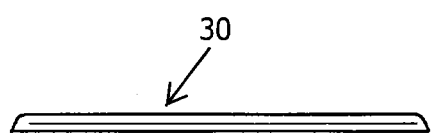
FIG. 16

BIODEGRADABLE ENVIRONMENTALLY-FRIENDLY MATERIAL, A CONTAINER, AND THEIR MANUFACTURING METHODS

CROSS-REFERENCE TO RELATED APPLICATIONS

This application is related to Chinese Patent Application No. 200910147886.1, filed Jun. 17, 2009 from which priority is claimed, and is hereby incorporated by reference.

STATEMENT REGARDING FEDERALLY SPONSORED RESEARCH

Not Applicable.

BACKGROUND

This invention relates to environmentally friendly materials and manufacturing methods. Specifically, it relates to a biodegradable environmentally friendly material, a product and a method of manufacturing.

Products made of plant fibers are non-toxic, odorless, and can endure high temperatures up to 180° C. and low temperatures as low as −40° C. Products that is are not recycled after use quickly degrade and are biodegradable in wild environment or landfill areas. Such products are environmentally friendly low molecular compounds, such as carbon dioxide and water, without secondary pollution to environmental and groundwater resources. Also, the plant fibers have very rich sources, are cheap as a raw material, and have a very promising market prospect.

However, the existing production process for plant fiber products is generally as follows: the plant fibers, adhesive waterproof agent, and other raw materials are mixed uniformly and put into the mold form to form a shape; then the shape is coated with a waterproof layer or color; and then dried using drying equipment. the shape becomes a product.

The plant fiber product made with the abovementioned method is environmentally friendly and does not pollute the environment. The existing technology as mentioned above has at least the following deficiencies: complex production processes, a large investment in coatings and drying equipment, a long production cycle, low productivity, and high energy consumption. As a result, the products have too high of price and poor market response. In addition, the technology is difficult to use and promote.

The abbreviation of polyethylene glycol is PEG, the chemical name is polyoxyethylene glycol ether, and the chemical formula is $HO(CH_2CH_2O)nH$ PEG mainly plays the role of lubrication and promotes bonding. PEG can be purchased directly in the market. In the "Practical Chemical Dictionary", ISBN 5082-3294-2, compiled by Zhu Hongfa as a chief editor and published in December 2004 and August 2007, polyethylene glycol is described as a lubricant, moisturizing agent, solubilizer, release agent, plasticizer, softener, emulsifier, dispersant, adhesive and a carrier.

Hexamethylene tetramine is commonly known as Hexamine, its chemical English name is hexamethylenetetramine, its English name is Urotropine, CAS No.: 100-97-0; its molecular formula is $C_6H_{12}N_4$, and its molecular weight is 140.18. Hexamine is mainly used to promote curing and shape formation of plant stalk powder and melamine plant fibers. Hexamine can be purchased directly in the market. In pages 115-116 of "Encyclopedia Chinese Chemical Products", edition 3, compiled under the organization of Chemical Industry Press and published in 2005 by Chemical Industry Press, the use of Urotropine is described as a curing agent for resins and plastics.

In addition, polyethylene glycol, and methenamine can function as an adhesive during high temperature extrusion forming and stabilizing during the curing process when they are used together with plant fibers in such processes. Polyethylene and Urotropine are new materials that can be used to replace zinc stearate. They can facilitate mold release for finished products, and avoid introduction of heavy metals. Therefore, the products made with them are more environmentally friendly and safe.

DESCRIPTION OF THE DRAWINGS

In the accompanying drawings which form part of the specification:

FIG. 5 is a lower isometric view first embodiment of the product;
FIG. 6 is an upper isometric view first embodiment of the product;
FIG. 7 is a top view of a second embodiment of a product;
FIG. 8 is a bottom view of the second embodiment of the product;
FIG. 9 is a side view of the second embodiment of the product;
FIG. 10 is an end view of second embodiment of the product;
FIG. 13 is a top view of a third embodiment of a product;
FIG. 14 is a bottom view of the third embodiment of the product;
FIG. 15 is a side view of the third embodiment of the product;
FIG. 16 is an end view of third embodiment of the product.

SPECIFICATION

Figure 1:
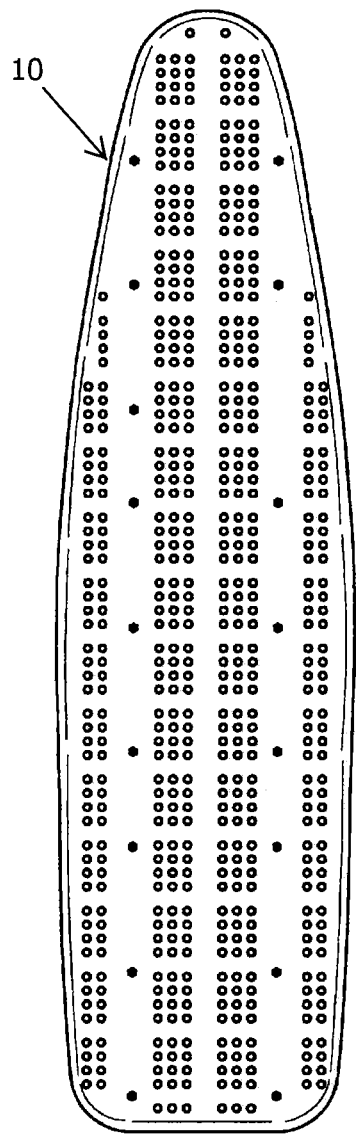
FIG. 1 is a top view of a first embodiment of a product.

The following detailed description illustrates the claimed invention by way of example and not by way of limitation. The description clearly enables one skilled in the art to make and use the claimed invention, describes several embodiments, adaptations, variations, alternatives, and uses of the claimed invention, including what is presently believed to be the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

Biodegradable Environmentally Friendly Material

Embodiment 1

This embodiment provides a biodegradable environmentally friendly material, the components and weight percentages of this material are as follows:
Plant Straw powder: 70%
Melamine: 20%
Polypropylene melt adhesive: 2%
Polyethylene glycol: 5%:
Hexamethylene tetramine: 1%
Talc powder: 2%.

Embodiment 2

In this embodiment, the components and weight percentages of the biodegradable environmentally friendly material are as follows:
Plant Straw powder: 60%
Melamine: 25%
Polypropylene melt adhesive: 3.5%
Polyethylene glycol: 6%
Hexamethylene tetramine: 0.5%
Talc powder: 5%

Embodiment 3

In this embodiment, the components and weight percentages of the biodegradable environmentally friendly material are as follows:
Plant Straw powder: 50%
Melamine: 30%.
Polypropylene melt adhesive: 6%
Polyethylene glycol: 8%
Hexamethylene tetramine: 1%
Talc powder: 5%

The Biodegradable Environmentally Friendly Product and the Embodiments of its Manufacturing Method Embodiment 1

Figure 2:
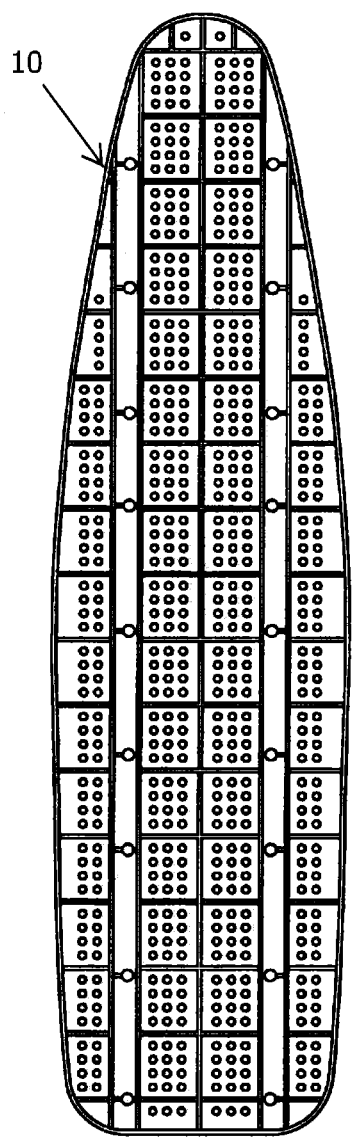
FIG. 2 is a bottom view of the first embodiment of the product.
Figure 3:
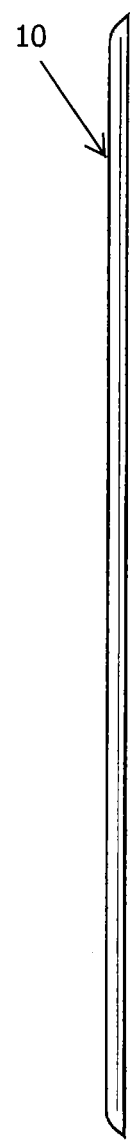
FIG. 3 is a side view of the first embodiment of the product.
Figure 4:
FIG. 4 is an end view of first embodiment of the product.
Figure 11:
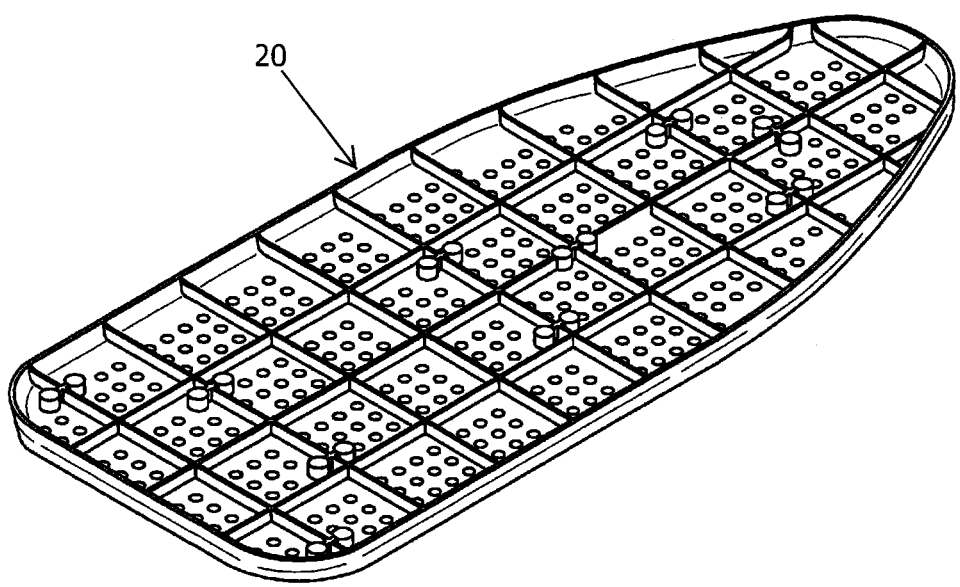
FIG. 11 is a lower isometric view second embodiment of the product.
Figure 12:
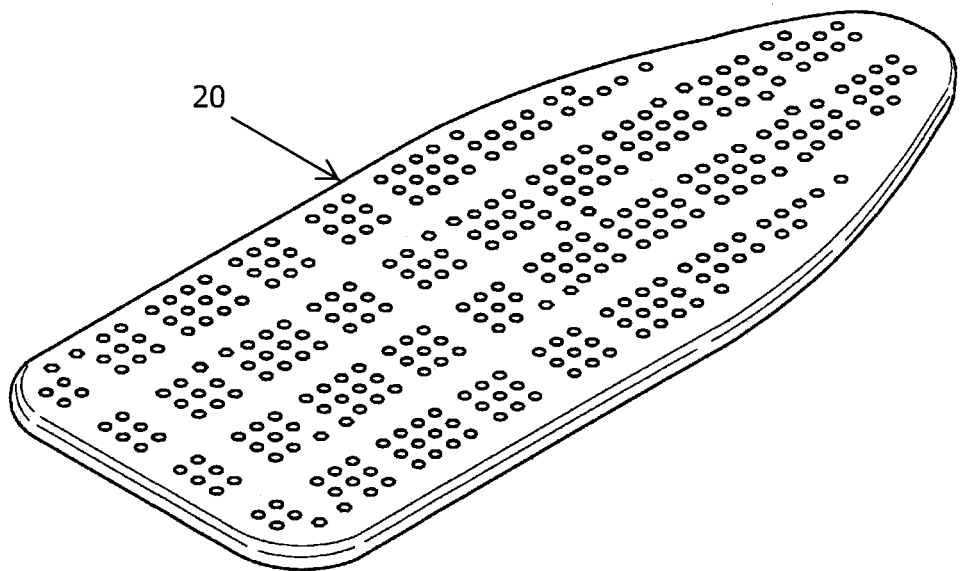
FIG. 12 is an upper isometric view second embodiment of the product.
Figure 17:
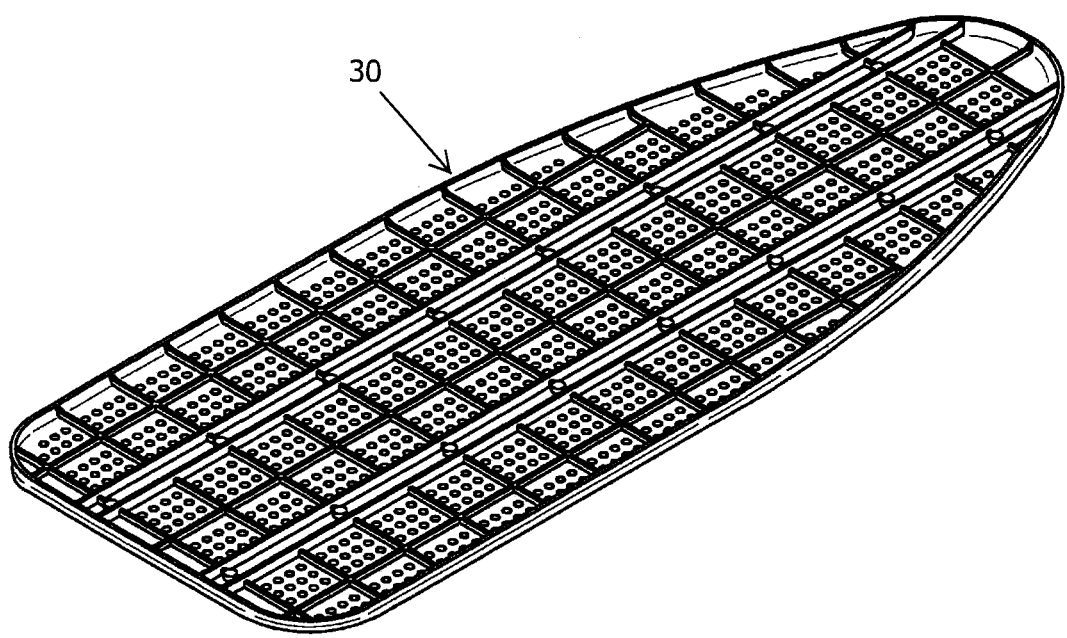
FIG. 17 is a lower isometric view third embodiment of the product.
Figure 18:
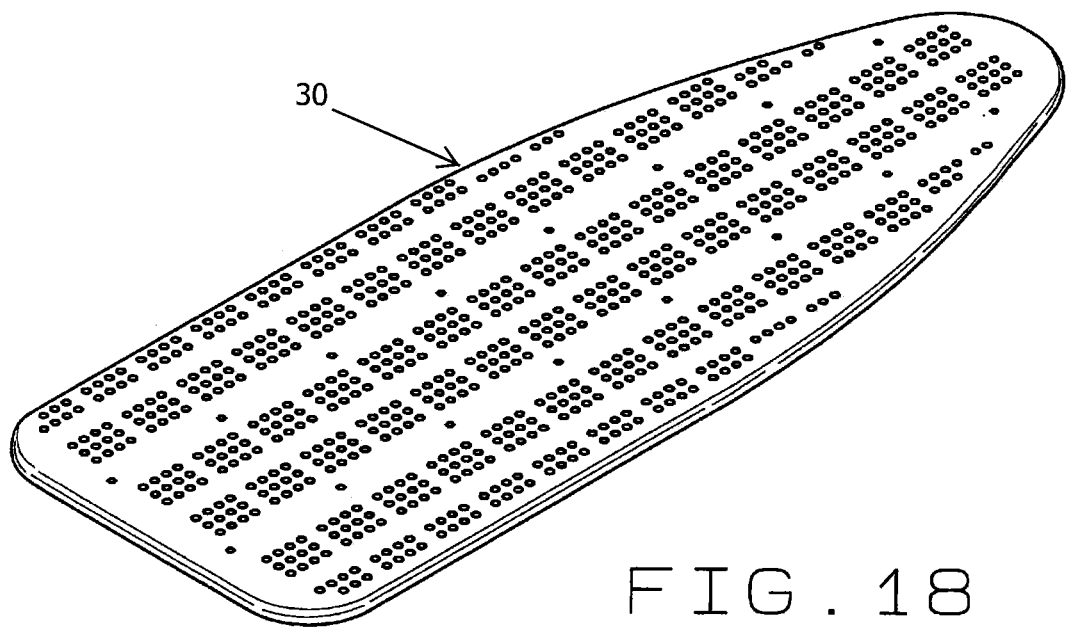
FIG. 18 is an upper isometric view third embodiment of the product.

In this embodiment, a biodegradable environmentally product, shown in FIGS. 1-18 as different sizes of ironing boards 10, 20, or 30, and the components and percentages of this product are as follows:
(1) According to the weight percentage, mix 65% of plant straw powder and 22% of melamine and stir them 15 minutes to a first semi-finished powder;
(2) The first semi-finished powder made in step (1) is added with 6% of polyethylene glycol and 2% of polypropylene melt adhesive, and then are mixed for 10 minutes to get a second semi-finished powder;
(3) The second semi-finished powder made in step (2) is added with 1% of hexamine and 4% of talc powder. They are mixed for 20 minutes to get the finished powder;
(4) The finished powder made in step (3) is put into the mold with a temperature of 140° C. and is press-formed a first time for 15 seconds. The mold is opened to breathe for 40 seconds The powder is formed for the second time for 40 seconds. The mold is opened to take out the finished product;
(5) The finished product made in step (4) is treated by removing the burs to obtain the product, which will be inspected, disinfected, and packaged.

In this embodiment, the fineness of plant straw powder is 60-mesh, the fineness of melamine is 80-mesh, the fineness of polyethylene glycol is 120-mesh, the fineness of polypropylene melt adhesive is 80-mesh, the fineness of methenamine is 80-mesh, and the fineness talc powder is 100-mesh.

Embodiment 2

In this embodiment, the biodegradable environmentally friendly product, shown in FIGS. 1-18 as different sizes of ironing boards 10, 20, or 30, and its manufacturing include the following steps:
(1) According to the weight percentage, mix 60% of plant straw powder and 25% of melamine and stir them for 15 minutes to obtain a semi-finished powder;
(2) The semi-finished powder made in step (1) is added with 6% of polyethylene glycol and 3.5% of polypropylene melt adhesive. They are mixed for 10 minutes to get a second semi-finished powder;
(3) The second semi-finished powder made in step (2) is added with 0.5% of hexamine and 5%, of talc powder. They are mixed for 20 minutes to get the a finished powder;
(4) The finished powder made in step (3) is put into the mold with a temperature of 160° C. and is press-formed for a first time for 8 seconds. The mold is opened to breathe for 2 seconds. The finished powder is press-formed a second time for 30 seconds. The mold is opened to take out the finished product; and
(5) The finished product made in (4) is treated by removing the burs to obtain the product, which will be inspected, disinfected and packaged.

Embodiment 3

In this embodiment the biodegradable environmentally friendly product, shown in FIGS. 1-18 as different sizes of ironing boards 10, 20, or 30, and its manufacturing method include the following steps:
(1) According to the weight percentage, mix 55% of plant straw powder and 30% of melamine and stir them for 15 minutes to obtain a first semi-finished powder;
(2) The first semi-finished powder made in step (1) is added with 5.5% of polyethylene glycol and 4.5% of polypropylene melt adhesive. They are mixed for 10 minutes to get a second semi-finished powder;
(3) The second semi-finished powder made in step (2) is added with 0.5% of hexamine and 4.5% of talc powder. They are mixed for 20 minutes to get a finished powder;
(4) The finished powder made in step (3) is put into the mold with a temperature of 150° C. and is press-formed for the first time for 10 seconds. The mold is opened to breathe for 3 seconds; Next, the powder is press-formed for the second time for 35 seconds, and then the mold is opened to take out a finished product;
(5) The finished product made in step (4) is treated by removing the burs to obtain the product, which will be inspected, disinfected, and packaged.

In the embodiment of the biodegradable environmentally friendly product and its manufacturing method, the production process is extremely simple, non-polluting, with very low energy consumption, a very short production cycle, high efficiency, and an extremely low production cost. The product can endure high temperatures of $\leq 180°$ C. and low temperatures of $\geq -40°$ C. The product is also corrosion-resistant, non-toxic, has no smell the waste buried underground can be completely degraded into harmless substances, without any adverse effects on water resources.

Although the biodegradable environmentally friendly product is shown in FIGS. 1-18 as different sizes of ironing boards 10, 20, and 30, the product can be any size or shape product.

After experiment, the complexity or production process, production cost, production efficiency, heat resistance, corrosion strength, liability to rupture, energy consumption, degradation and other properties of the products made with the present disclosure compared with that similar products are listed in the table:

| | |
|---|---|
| Complexity of production process | The present disclosure has a complete set of dry powder production process and a special formula, materials can be formed directly into present shapes and colors can be changed during forming, no longer need to be coated the waterproof layer or colored, and dried with drying equipment as with backward technology; thus it saves significant cost, and makes products more environmentally friendly to meet customer needs and is more favorable for marketing. |
| Production cost | During production process, press-forming is simple to operate any color and shape can be used, forming is consistent, the rate of finished products is more than 98%, up to 20% of production cost can be saved. |
| Production efficiency | As a special dry powder manufacturing process is used in the present disclosure, so the mold forming process is very simple, thereby production efficiency is increased by 30% |
| Heat resistance | −40° C. to 180° C. |
| Corrosion resistance | Conforming to GB 18006.1-1999, GB/T 5009.203-2003 and qualified after testing. |
| Strength | Conforming to GB 18006.1-1999, GB/T 5009.203-2003 and qualified after testing. |
| Liability to rupture | Conforming to GB 18006.1-1999, GB/T 5009.203-2003 and qualified after testing. |
| Energy consumption | Decreased by 20% compared to existing technologies |
| Degradation property | Over 80% |

To sum up, in each embodiment, discarded plant straws of crops and abandoned scraps of bamboo can be crushed into 60-80 mesh powder material to obtain a plant straw powder. The plant straw powder contains 60-70% plant fibers in weight percentage. The plant straw powder is used as a main ingredient, at the same time, melamine, polypropylene melt adhesive, polyethylene glycol, hexamethylene tetramine and talc powder are used as assistant ingredients for bonding and stability. The main ingredient and assistant ingredients are mixed together in proportion and blended uniformly, and then put in a mold with a temperature of 140-160° C. for press-forming. The formed finished product is sterilized and packaged. The melamine is resin-like, mainly used for bonding during high temperature extrusion forming process, and polyethylene glycol and methenamine are used for stabilization during the curing process. Compared to existing technologies, the amount of melamine used in the present disclosure is reduced, because and polyethylene glycol and hexamethylene tetramine are used. This can overcome the disadvantages of the prior art, such as complex production process, high cost and low efficiency of the existing production technology, and achieve the advantages of good heat resistance, good corrosion resistance, good strength, not easy to break, simple production process, low production cost, low energy consumption, and high production efficiency.

Changes can be made in the above constructions without departing from the scope of the invention, it is intended that all matter contained in the above description or shown in the accompanying drawings shall be interpreted as illustrative and not in a limiting sense.

What is claimed is:

1. A biodegradable environmentally friendly material, comprising:
    plant straw powder with a weight percentage of the total weight of material of about 50-70%;
    melamine with a weight percentage of the total weight of material of about 20-30%;
    polypropylene melt adhesive with a weight percentage of the total weight of material of about 2-6%;
    polyethylene glycol with a weight percentage of the total weight of material of about 5-8%;
    hexamethylene tetramine with a weight percentage of the total weight of material of about 0.5-1%; and
    talc powder with a weight percentage of the total weight of material of about 2-6%.

2. A method of manufacturing a biodegradable environmentally friendly container, comprising the steps of:
    providing a set of components, having:
        plant straw powder with a weight percentage of the total weight of material of about 50-70%;
        melamine with a weight percentage of the total weight of material of about 20-30%;
        polypropylene melt adhesive with a weight percentage of the total weight of material of about 2-6%;
        polyethylene glycol with a weight percentage of the total weight of material of about 5-8%;
        hexamethylene tetramine with a weight percentage of the total weight of material of about 0.5-1%; and
        talc powder with a weight percentage of the total weight of material of about 2-6%;
    mixing the set of components together in proportion and blending uniformly to form a mixed powder;
    placing the mixed powder into a mold with a temperature of about 140-160° C. to form a finished product;
    treating the finished product to remove burs;
    inspecting the finished product;
    disinfecting the finished product; and
    packaging the final product.

3. A method of manufacturing a biodegradable environmentally friendly container, comprising the steps of:
    providing a material;
    press-forming the material in a mold for about 8-15 seconds;
    opening the mold for breathing for about 2-4 seconds;
    press-forming the material for about 30-40 seconds; and
    opening the mold for removal of a finished product.

4. The method of manufacturing of claim 3, wherein the material comprises:
    plant straw powder with a weight percentage of the total weight of material of about 50-70%;
    melamine with a weight percentage of the total weight of material of about 20-30%;
    polypropylene melt adhesive with a weight percentage of the total weight of material of about 2-6%;
    polyethylene glycol with a weight percentage of the total weight of material of about 5-8%;
    hexamethylene tetramine with a weight percentage of the total weight of material of about 0.5-1%; and
    talc powder with a weight percentage of the total weight of material of about 2-6%.

* * * * *

UNITED STATES PATENT AND TRADEMARK OFFICE
CERTIFICATE OF CORRECTION

PATENT NO.         : 8,431,200 B2
APPLICATION NO.    : 12/817922
DATED              : April 30, 2013
INVENTOR(S)        : Chen Yaotian It is certified that error appears in the above-identified patent and that said Letters Patent is hereby corrected as shown below:

In the Specifications:

Col. 4, Line 17
 Replace "6%"
 with --4%--

Col. 4, Line 17
 Replace "3.5%"
 with --3%--

Col. 4, Line 21
 Replace "0.5%"
 with --1%--

Col. 4, Line 22
 The word "the"
 should be deleted.

Signed and Sealed this
Second Day of July, 2013

Teresa Stanek Rea
*Acting Director of the United States Patent and Trademark Office*